3,462,098
WIRE DISPENSING DEVICE
Andrea Sommo, Settimo Torinese, Torino, Italy, assignor to Sommo Andrea & C. S.n.c., Settimo Torinese, Torino, Italy
Filed Sept. 22, 1967, Ser. No. 669,876
Claims priority, application Italy, Sept. 24, 1966, 777,454/66
Int. Cl. B65h 49/00
U.S. Cl. 242—129.8      3 Claims

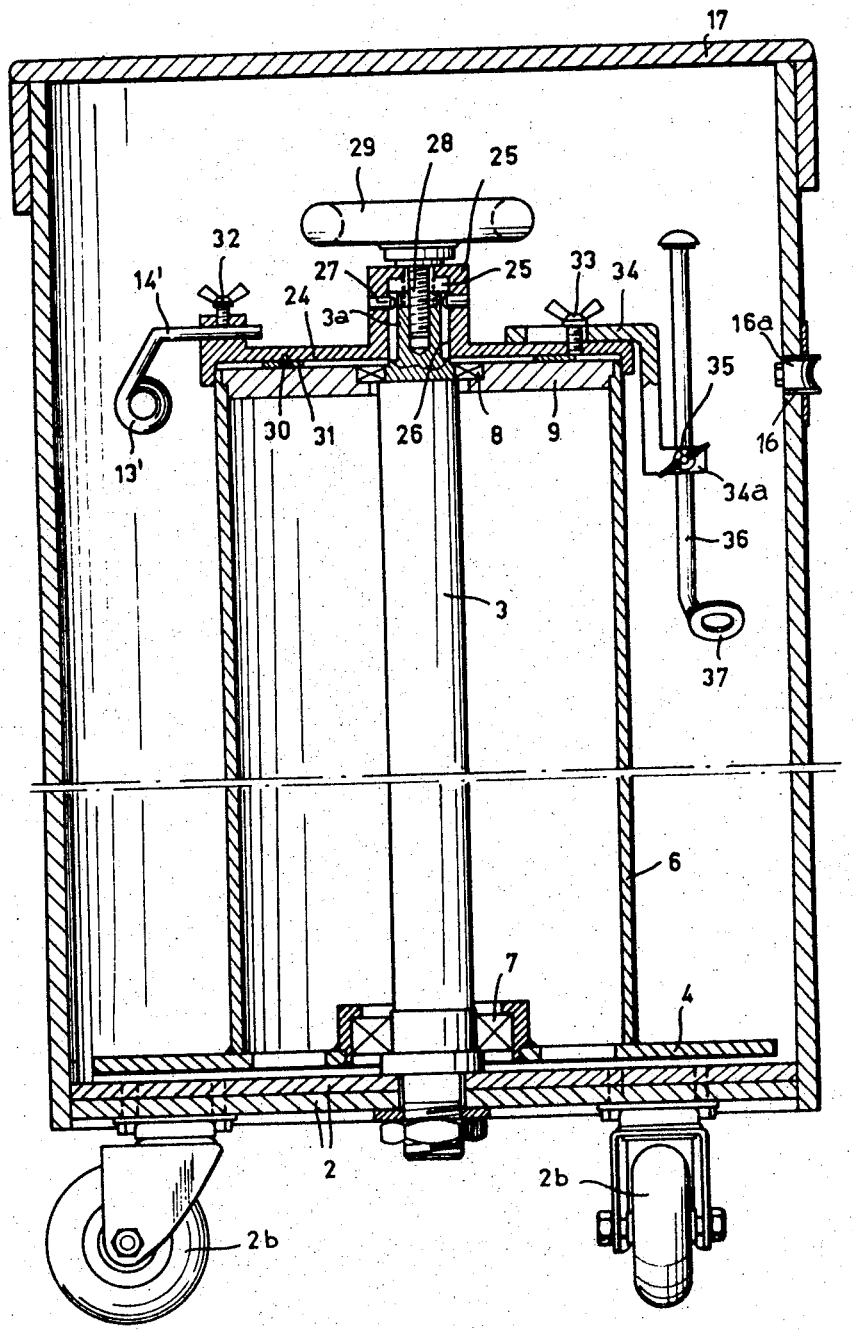
Fig_2

# United States Patent Office 3,462,098
Patented Aug. 19, 1969

ABSTRACT OF THE DISCLOSURE

A wire dispensing device has a fixed casing, enclosing a rotatable support for a reel or coil. The wire passes through a guide and makes at least one turn around the support before passing through an outlet in the casing, so that withdrawal of the wire causes dispensing rotation of the support.

---

Figure 1:
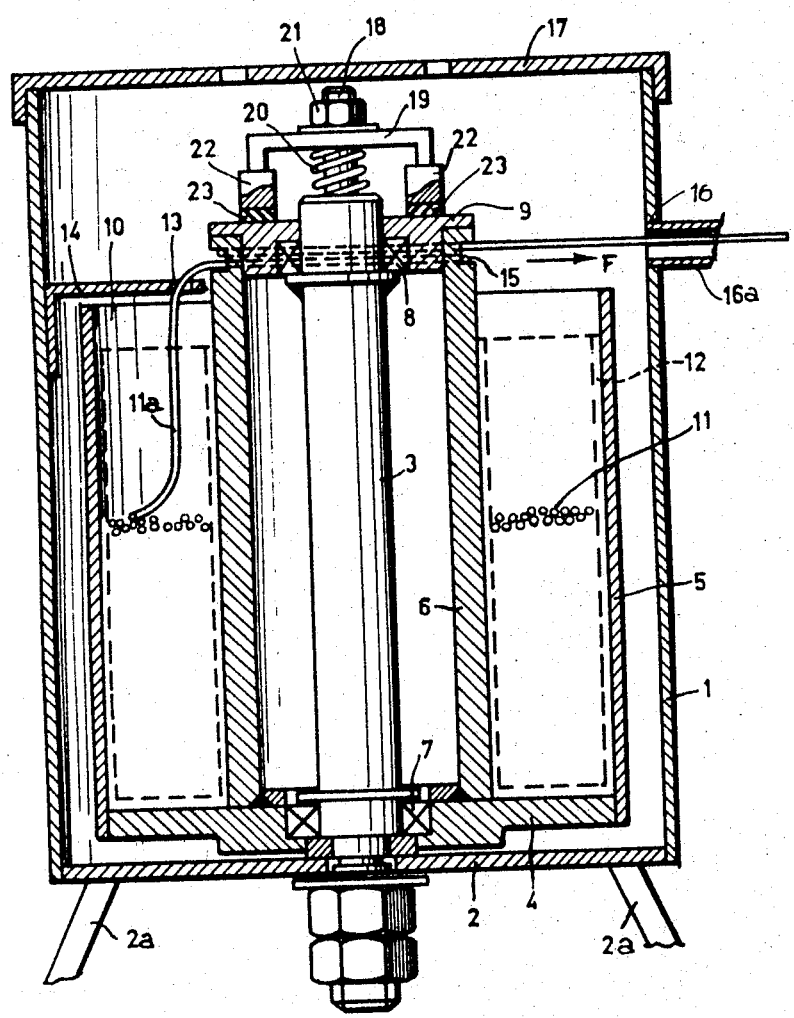

This invention relates to wire dispensing devices, for example devices for dispensing wire solder to supply continuous welding machines.

Normally wire solder for use in a continuous welding machine is supplied in the form of hanks or coils of relatively low weight. The small quantity of wire in each hank or coil is a source of inconvenience, as it necessitates stopping the associated welding machine relatively frequently in order to replenish the wire solder supply.

According to the present invention there is provided a wire dispensing device comprising an outer stationary tubular casing having rotatably mounted therein a support member on which a coil or spool of wire may be supported, at least one fixed wire guide within the casing which is adapted to guide wire from a said coil or spool to one end of the support member about which the wire makes at least one helical turn in use of the device before passing through outlet means in the casing, whereby withdrawal of wire through said outlet means causes rotation of the support member to withdraw the wire from a coil or spool supported thereon.

When used to dispense wire solder in a welding machine, the device according to the invention is particularly advantageous, as coils or spools of wire may be supported on the support member and unwound directly therefrom, each coil or spool holding a considerably larger quantity of wire than the conventional hank or coil. Consequently, less frequent interruption of the operation of the welding machine is necessary.

Preferably the outlet means comprise an opening in the casing merging into a wire-guiding sheath through which wire is led to a point of use, for example, a continuous welding machine.

Preferably brake means are provided and are adapted to engage one axial end of the rotatable support member to check rotation thereof and prevent more wire than is required being unwound from a coil or spool.

The invention will be more partiucularly described, by way of example only, with reference to the accompanying drawings, in which:

FIGURE 1 is a diagrammatic axial section through a wire dispensing device according to one embodiment of the invention, and FIGURE 2 is a diagrammatic axial section through a modification of the embodiment of FIGURE 1.

Referring to FIGURE 1, a wire dispensing device has a stationary outer casing comprising a cylindrical part 1 arrayed with its axis vertical and a flat base 2. A fixed shaft 3 is affixed centrally to the base 2 and extends axially within the casing. The base 2 is supported on a framework 2a which may if desired be provided with wheels 2b, as shown diagrammatically.

A rotatable support member is mounted within the casing and comprises a base member 4 to which outer and inner cylindrical walls 5, 6 are affixed, both walls 5, 6 extending upwardly from the base member 4 and being coaxial with the shaft 3. The support member is mounted for rotation about the shaft 3 on lower and upper ball or roller bearings 7, 8, respectively, the lower bearing 7 being disposed in the base member 4 and the upper bearing 8 in an annular cover member 9 attached to the upper end of the inner cylindrical wall 5. The cylindrical walls 5, 6 define between them a chamber 10 of annular section in which a coil or hank 11 of wire may be received. Alternatively a spool or bobbin of wire, shown in broken lines 12, may be accommodated in the chamber 10.

A fixed wire guide is provided at the upper end of the chamber 10 in the form of a hole 13 in a strip 14 extending radially inwardly from and attached to the cylindrical casing part 1. The upper end of the inner cylindrical wall 6 adjacent the wire guide is provided with an external circumferential groove 15. A wire outlet opening is provided in the wall of the casing part 1 directly opposite the groove 15 and on the side thereof remote from the strip 14. A wire-guiding sheath 16a is fitted into the opening 16 and leads to a point of use, for example a continuous welding machine (not shown).

In use of the dispensing device a coil 11 or spool 12 of wire 11a is placed in the chamber 10 and the free end of the wire 11a is led through the guide hole 13. The wire 11a is formed into at least one helical turn within the groove 15 of the inner cylindrical wall 6 and then passed outwardly through the opening 16 and thence through the sheath 16a to the point of use.

As the wire 11a is consumed at the point of use fresh wire 11a is drawn through the sheath 16a and the opening 16 in the direction of arrow F, and the winding of the wire about the inner cylindrical wall 6 of the support member causes the latter to rotate about the shaft 3, withdrawing wire from coil 11 or spool 12.

A removable cover 17 is provided on the upper end of the cylindrical casing part 1. The cover 17 is removed to replenish the wire supply in the chamber 10.

It is necessary to provide means for braking the rotation of the support member to prevent the latter unwinding more wire than is required.

In the embodiment of FIGURE 1 the shaft 3 has an upward extension 18 having a screw-threaded end on which a strap 19 is received. The strap 19 is urged upwardly by a compression spring 20 located between the strap 19 and the upper end of the shaft 3, and is retained in an adjusted position axially by means of an adjuster nut 21 threaded on the extension 18. The strap 19 has two axially downwardly projecting ends 22, each provided with a respective friction lining 23 which engages the upper surface of the cover member 9 with a pressure determined by the setting of the adjuster nut 21. The friction linings 23 serve to brake the rotation of the support member about the shaft 3 to an adjustable extent determined by the nut 21.

FIGURE 2 shows a modification of the embodiment of FIGURE 1. Parts of FIGURE 2 which are the same as those of FIGURE 1 are indicated by the same reference numerals as those used in FIGURE 1, and further description of these parts is not necessary.

The rotatable member of FIGURE 2 is adapted to support spools 12 of wire only, and for this reason the external cylindrical wall (5 in FIGURE 1) of the support member is omitted.

A thrust member comprising stationary disc 24 is mounted above the rotatable support member 4, 6 and is provided centrally with a tubular member 25 which surrounds a reduced end portion 3a of the shaft 3. The end portion 3a is formed with at least one longitudinally extending groove 26 which is engaged by a pawl 27 secured internally to the surrounding tubular member 25. A thrust spring 20' located between a closed upper end of the member 25 and the shaft end portion 3a urges the tubular member 25 outwardly against an adjustable stop 29. The stop 29 is attached to a screw-threaded spindle 28 which is screwed into a threaded recess formed centrally in the end portion 3a of the shaft 3, the spindle 28, spring 20' and tubular member 25 all being arrayed coaxially with the shaft 3.

An annular friction lining 31 is secured to the bottom face of the disc 24 by means of rivets 30 and is adapted to engage frictionally the upper surface of the cover member 9 of the rotatable support member 4, 6. If desired the said upper surface of the cover member 9 may also be provided with a friction lining.

Adjustment of the setting of the stop 29 by means of the screw-threaded spindle 28 enables the disc 24 to be adjusted axially so as to compensate for wear in the lining 31 and to adjust the braking pressure applied to the rotatable member 4, 6.

Two opposed straps 14', 34 are detachably secured to the disc 24 by means of respective wing nuts 32, 33. The strap 14' carries an upper fixed wire guide 13', while the strap 34 carries a lower wire guide 37 which is adjustable in position vertically and is secured to the end 34a of the strap 34 by means of a wing nut 36.

The wire 11a to be dispensed from a spool 12 in the chamber 10 passes through the lower guide 37 and the upper guide 13' in succession before passing in at least one turn in the groove 15 about the cylindrical wall 6 and thence through the opening 16 into the wire-guiding sheath 16a.

By means of the dispersing device of the present invention wire can be dispersed directly from a coil or spool containing a considerable length of wire. Thus the frequency with which the dispersing device needs to be recharged with wire is considerably reduced.

The dispensing device is particularly useful for supplying wire solder to a continuous welding machine, in which case coils or spools weighing about 45–50 kg. may be used, as compared with coils weighing about 8–10 kg. used conventionally.

I claim:
1. A wire dispensing device comprising: an outer stationary casing, a fixed upstanding shaft arranged centrally inside said casing, a support member mounted for free rotation about said shaft and comprising at least one cylindrical wall and a base member at its lower end for supporting wire, at least one wire guide within the casing, and wire outlet means in the casing arranged to receive wire after it has passed through the said wire guide, brake means mounted on the upper end of said shaft and longitudinally displaceable with respect to said shaft end, an annular friction member interposed between said brake means and a portion of said support member, spring means interposed between the upper end of said shaft and said brake means, and threaded adjustment means opposing the action of said spring means and fastening said brake means to said upper end of said shaft.

2. A device according to claim 1 wherein said brake means comprises a strap member mounted for axial movement on the upper end of the shaft, said annular friction lining mounted on said strap member so as to surround the upper end of said shaft, said spring means comprising a helical spring interposed between said strap member and the upper end of said shaft so as to urge said strap member upwardly, said threaded adjustment means engaging the upper surface of said strap member and screwed on a threaded extension of said shaft so as to adjust the position of said strap against the action of said helical spring.

3. A device according to claim 1 wherein said brake means further comprises a thrust member, said thrust member including a disc mounted on the upper end of said shaft so as to be rotatable therewith, said annular friction member interposed between said disc and said portion of said supporting member, a first wire guide mounted so as to be in a fixed position on said disc, and a second wire guide mounted on said disc and provided with means for adjusting its position vertically with respect to said disc.

References Cited
UNITED STATES PATENTS

| | | | |
|---|---|---|---|
| 2,528,410 | 10/1950 | Banaszak | 242—156.2 |
| 2,957,643 | 10/1960 | Bosworth et al. | 242—128 |

LEONARD D. CHRISTIAN, Primary Examiner